United States Patent [19]

Galbraith

[11] 4,076,398
[45] Feb. 28, 1978

[54] VISUAL COMMUNICATIONS SYSTEM

[75] Inventor: Charles L. Galbraith, Raritan, N.J.

[73] Assignee: Ortho Pharmaceutical Corporation, Raritan, N.J.

[21] Appl. No.: 607,743

[22] Filed: Aug. 26, 1975

Related U.S. Application Data

[63] Continuation-in-part of Ser. No. 405,194, Oct. 10, 1973, abandoned.

[51] Int. Cl.² ............ G03B 21/26; G03B 21/14
[52] U.S. Cl. .................. 353/69; 353/28; 353/121
[58] Field of Search ............ 353/81, 82, 94, 121, 353/122, 10, 15, 28, 69; 33/1 C

[56] References Cited

U.S. PATENT DOCUMENTS

| 647,608 | 4/1900 | Pietzner | 33/1 C |
| 1,189,799 | 7/1916 | Erickson | 353/117 |
| 1,596,458 | 8/1926 | Schiesari | 33/1 C |
| 1,653,180 | 12/1927 | Jalbert | 353/28 |
| 1,716,768 | 6/1929 | Edmonds | 33/1 C |
| 2,158,906 | 5/1939 | Netter | 353/29 |
| 3,053,144 | 9/1962 | Harries et al. | 353/70 |

*Primary Examiner*—Steven L. Stephan
*Attorney, Agent, or Firm*—Benjamin F. Lambert

[57] ABSTRACT

A multiple screen projection system including translucent multiple projection-receiving surfaces is described. The projection-receiving surfaces are adapted to receive a distortion-free image projected from front or rear on said surfaces from a point remote from an observer. A method of preparing a series of two-dimensional images which, when reproduced and projected onto a three-dimensional screen, will maintain focus and precise registration without distortion is also described.

3 Claims, 11 Drawing Figures

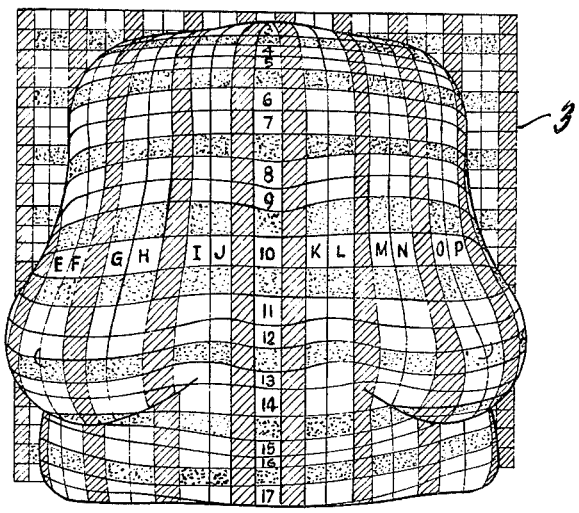
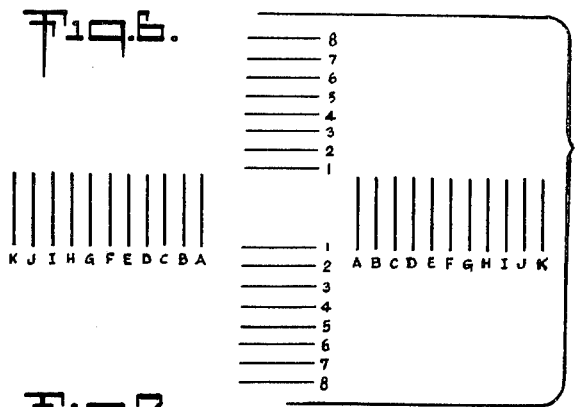
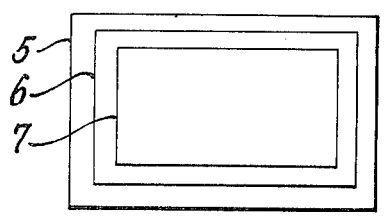
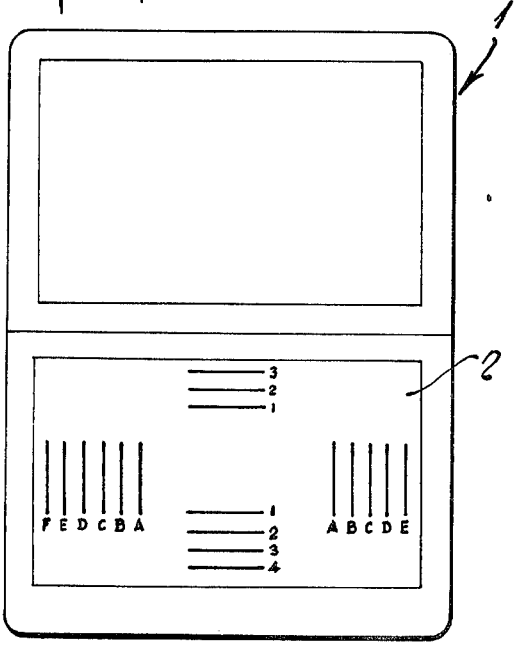
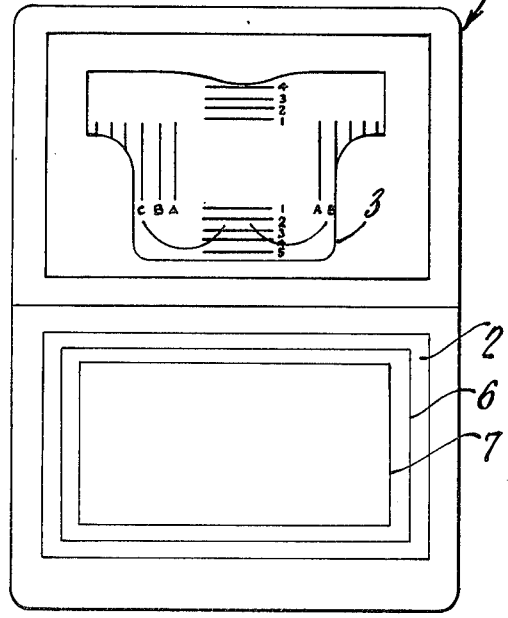

VISUAL COMMUNICATIONS SYSTEM

This is a continuation-in-part of application Serial No. 405,194, filed October 10, 1973, now abondoned.

This invention relates to a multiple screen projection system suitable for displaying various structural parts and their function or operation in a given system. The structural parts can be displayed on a screen in such a manner as to render the positions and functions of each part clearly apparent to a viewer.

More particularly, the invention relates to a projection system which is adapted for use in connection with a simulation of parts of a body such as that of an animal or human being. The system may also be employed, however, to simulate parts of other structures such as an automobile engine, complex industrial machinery, and the like.

A method of producing a series of two-dimensional images from original art which, when projected onto a three-dimensional surface, will maintain precise registration throughout the series of images and eliminate distortion without the use of any device placed on either the projector or screen or between them in any way is also part of the present invention. The two-dimensional images can be reproduced by any means suitable for projection such as still photography, cinematography, videotape and the like. The method also permits alignment of the projector and screen surfaces so that, when the first image is projected and adjustments are made by moving either the projector and/or screen, all subsequent projected images will appear in perfect alignment and registration.

The principal object of this invention is to provide a visual communications system which makes possible the demonstration, among other things, of the interaction of the structural components of a given mechanical structure or various physiological processes which occur within an organism through the projection of distortion-free images on a three-dimensional screen and/or a two-dimensional screen. The communications system is thus very useful as a teaching aid in the teaching of physiology, anatomy, shop crafts and other kindred arts and sciences.

A second object of this invention is to provide a system for projecting distortion-free two-dimensional images onto three-dimensional surfaces while still maintaining precise registration and alignment throughout the series of images.

These and other objects of this invention will become more apparent from the detailed description of the preferred embodiments presented below.

By means of the present invention, a multiple screen projection system is provided which includes two or more interchangeable, adjustable screens for the reception of still or motion pictures which simulate the parts of various structures. Because of its ability to display various structural parts as a multiscreen projection, the communications system, which is the subject of this invention, is particularly useful as a physiological demonstration apparatus. For example, it can be used to visually portray certain steps in the processes accomplished by various organs of the human body.

The communications system which is the subject of the present invention is illustrated in the accompanying drawings wherein:

FIG. 5 is a perspective view of a grid of equal sized squares projected onto a three-dimensional screen.

FIG. 6 is a diagrammatic view of the horizontal and vertical lines used to align and register the images.

FIG. 7 is a diagrammatic view of one of the photographs taken of the parallel lines of FIG. 6.

FIG. 8 is a diagrammatic view of the rectangles used in the final alignment of the projector with the screen.

FIG. 9 is a diagrammatic view of the equally spaced parallel lines placed over an image prepared for the three-dimensional screen and the rectangles shown in FIG. 8.

Figure 1:
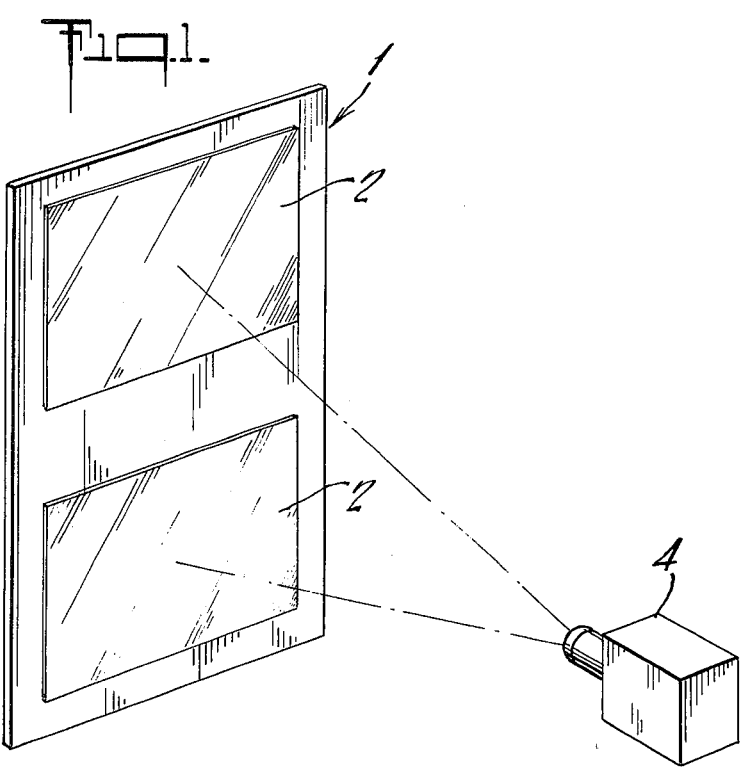
FIG. 1 is a perspective view of a multiple screen projection system having flat projection surfaces.
Figure 2:
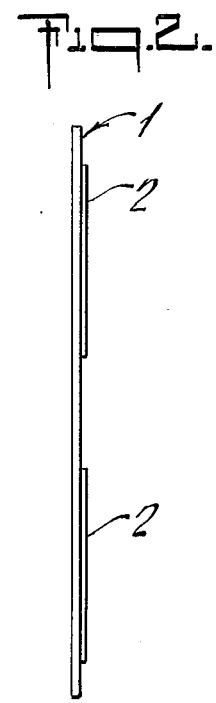
FIG. 2 is a side view of the multiple screen projection system of FIG. 1.
Figure 3:
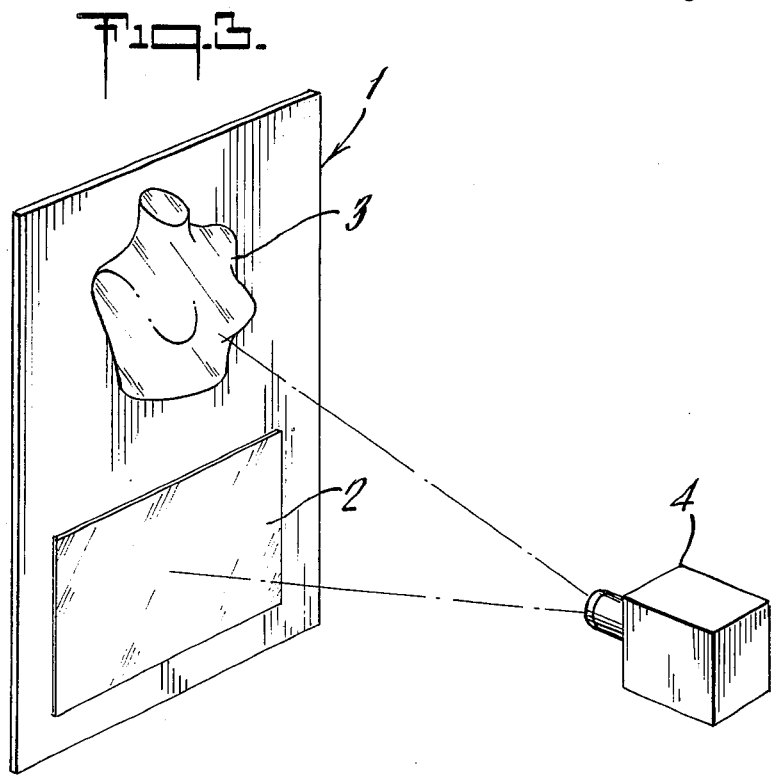
FIG. 3 is a perspective view of a multiple screen projection system having at least one three-dimensional projection surface.
Figure 4:
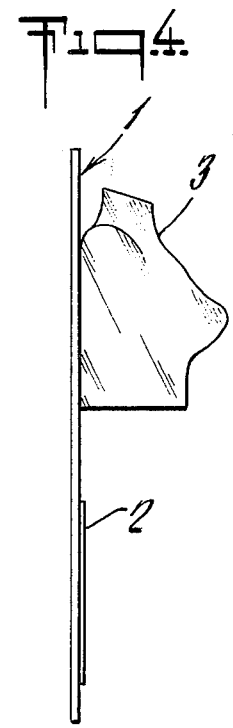
FIG. 4 is a side view of the multiple screen projection system of FIG. 3.

In the present invention there is provided a projection-receiving surface 1 which contains two or more translucent screens 2 for receiving a projected image. The screens may be made of a translucent plastic resin or any other substance which will serve as a projection screen suitable to receive projected images from front or rear. For the purpose of simplicity, the invention will be described as a dual screen system, but it will be readily apparent to one skilled in the art that the same principles will apply to a multiscreen system, that is, a system comprising two or more screens.

When a dual screen system is employed, both of the screens may have flat surfaces 2 on which the image can be projected. Alternatively, one of the screens may be a curvilinear screen consisting of a three-dimensional representation 3 of the structure to be demonstrated, such as, for example, an automobile engine, a human pelvis or torso.

Where a three-dimensional screen is employed, the structural part to be demonstrated is projected onto the structural representation 3 as a still or moving image. This permits presentation of the subject structural part in actual size, where desired, and in actual location in relation to the parent structure. The second screen is juxtaposed to the first screen to permit simultaneous projection of the structural part in an enlarged, sectioned view or in a sectioned view on a flat surface. The second screen can also be utilized to project printed titles to label the components of the structural parts being shown. Where a multiscreen system is employed, the second, third, and fourth screens, etc., can be used to illustrate different sections or enlargements of the structural parts. The screens are designed to be adjustable and interchangeable to permit the use of a wide range of three-dimensional forms.

The communications system is also provided with one or more means 4 for projecting the image onto the screen; the preferred projection means comprises a single projector which is adapted to project a single photograph or slide which has been prepared in such a way as to permit projection of the images onto two or more screens of different configuration simultaneously from a single slide or photograph. Any standard slide projector or motion picture projector can be used as the projection means. Thus a wide range of projectors and lenses may be employed. The projection of the slides or motion pictures may be synchronized with a suitable audio system by the addition of any of the commonly available audio tracks designed for this purpose.

It will be understood that if a two-dimensional image is projected from a transparency or other surface onto a three-dimensional receiving surface, parts of the screen will receive projected rays at oblique angles which may vary widely from one part to the next. "Barrel" distortion of parts of the image on the three-dimensional screen will occur causing straight lines to become curved to varying degrees according to the curvature of the screen.

In accordance with the present invention, where a structural three-dimensional representation is employed as the screen, distortion-free images are projected which give the impression of being life-size figures to the viewer when viewed from the front. The images projected on the screens may be in color or black and white. The use of color images, however, enhances the semblance of reality.

The two-dimensional images which are projected onto the three-dimensional screen are prepared from original art in such a manner that, when the image is reproduced and projected onto the screen or three-dimensional surface, a distortion-free image is projected and registration and alignment are maintained throughout the series of images.

Systems for projecting two-dimensional images onto single or multiple two-dimensional and/or three-dimensional screens or combinations thereof have been described. For example, U.S. Pat. No. 1,653,180 describes a method of projecting two-dimensional images onto three-dimensional screens. The patent deals only with the configuration of the projection screen and the placement of the projection source. No reference is made either to registering the image on the screen initially or maintaining registration from one image to another in a series. In addition, no mention is made of the distortion which occurs when flat images are projected onto three-dimensional screens or how one can compensate for such distortion.

U.S. Pat. No. 3,053,144 describes an optical system for projecting two-dimensional images onto a three-dimensional screen without significant distortion. The paths of the light rays from the image are corrected before they reach the three-dimensional viewing screen by means of a correction device at least one surface of which comprises a plurality of facets separated by lines of discontinuity of slope, the gradients of each facet being such that the path of the bundle of rays arriving at that facet from the two-dimensional image are modified so as to displace the points of arrival of the rays at the three-dimensional object or screen into such positions that barrel distortion where the projected rays meet the viewing screen obliquely is substantially avoided.

In the present invention, two-dimensional art is prepared for projection onto three-dimensional screens in a manner which results in the obtainment of a projected image which is distortion-free without the aid of external correction devices. In addition, the margin of error in the registration of structures and features on the three-dimensional screen is small. For purposes of discussion only, the multiscreen projection system is described in terms of dual projection screens mounted in proximity to each other within a single housing. For convenience a three-dimensional screen is mounted in the upper part of the housing and a flat two-dimensional screen is mounted in the lower portion of the housing. However, any number of screens may be employed and any convenient spatial arrangment of the screens is contemplated; e.g. a side-by-side or a horizontal arrangement may also be employed. Whatever particular spatial arrangement is employed, the images are aligned or registered so precisely by the present method that the resulting projected images that appear on the screens maintain a semblance of reality and consistency from one image to the next. For the purpose of illustrating the method of preparing the two-dimensional art, the method will be described in terms of a bifurcated slide, i.e. a slide having two distinct projectable images thereon. It will be readily apparent, however, that a slide containing one or more images may be employed.

According to the present invention, the degree of distortion of flat images which occurs when flat images are projected onto three-dimensional screens is first determined by projecting a grid axis onto the three-dimensional screen in question (FIG. 5). The grid is made up of horizontal and vertical rows and columns drawn on a suitable material such as paper, for example and then photographed. The rows and columns form a grid of equal sized squares; the horizontal rows are arbitrarily designated by numbers and the vertical columns by letters. Every third row and column is shaded and no number or letter is assigned to it. This is done simply to make the grid easier to read by providing some separation between the rows. The photograph of the grid is then projected onto the three-dimensional screen. The straight lines, rows and columns of the grid become curved and distorted when the image of the grid is projected onto the uneven surface of the three-dimensional screen. The image is then photographed from a position perpendicular to the screen and from a variety of angles to the right and left of the perpendicular. The resulting photographs, which indicate graphically the degree to which the straight rows and columns are distorted when projected onto the curved three-dimensional screen, are used as a guide in preparing flat two-dimensional art with the distortions drawn into it. Some of the squares of the grid are altered considerably in size and shape when projected onto the curved surface of the three-dimensional screen. The art is prepared from the projected image such that transparencies or photographs prepared from the art are distortion-free when projected. For example, where squares become elongated, compensation therefor is made by drawing the art shorter in that area so that when it is reproduced and projected, the resulting three-dimensional image will appear free from distortion in that area. It should be understood that the original two-dimensional art prepared as described above will appear to be distorted and unreal. Only after the art is reproduced and projected onto the three-dimensional screen does it appear to be distortion free. The photographs of the grid as projected on the three-dimensional screen are used as guides in preparing all other pieces of art. The size of all of the drawings is arbitrary; the drawings are drawn to a size convenient for the artist. It will be apparent, however, that once having chosen a particular size for the drawings, the artist will make all art in a given series the same size in order to maintain uniformity.

After the first piece of art for the three-dimensional screen has been drawn according to the distortions apparent in the photographs of the grid as projected onto the three-dimensional screen, limits and boundaries are then determined within which all other art pieces in the series of images to be produced will be drawn for eventual projection on a three-dimensional and/or a two-dimensional screen located in a single housing. The images for both the three-dimensional and the two-dimensional screen are preferably contained within a single frame or slide. Where a single frame or slide is employed, it is necessary to align and register both of the images on the frame with their respective screens and to maintain registration and alignment of both of them simultaneously.

The alignment and registration for the images to be projected onto the two-dimensional screen are determined by first drawing evenly spaced lines on a horizontal and vertical axis (FIG. 6). For the purpose of identification, the lines of the vertical axis are designated by number; the lines on the horizontal axis are designated by letter. Any convenient designation may be employed, however. The actual number of lines drawn is not critical. Generally about eight lines are drawn in each direction starting from the edge of the surface. The distance between the lines is dependent upon the size of the screen onto which the image will ultimately be projected. Generally a distance of between ¼ to ½ inch is suitable depending upon the size screen employed. In screens designed to portray life size images, it is preferred to draw the lines about 3/8 inch apart to obtain the best results.

Two series of photographs of the drawing are made. The method of reproduction employed is not critical. Generally the same medium used for final projection onto the screen is employed. In one series of photographs, the drawing is moved inwardly along the horizontal axis. With each successive photograph, the drawing is moved to the right or left, as the case may be, the distance equal to the space between two adjoining lines. The drawing is then photographed in this manner step by step from one side to the other. In the second series of photographs, the drawing is moved through the vertical axis in the same way as it was moved through the horizontal axis. By this procedure a transparency, film, etc. is prepared which is employed in the final step in the alignment procedure.

The resulting series of photographs are projected onto the two-dimensional screen (FIG. 7). From this projection, two photographs are selected, one from the horizontal series and one from the vertical series. The number and letter designation of the first lines visible within the borders of the screen are noted. These lines describe a rectangle proportional to the size of the two-dimensional screen which falls just inside the borders of the screen when projected. Within this rectangle, two more rectangles are drawn (FIG. 8). For convenience the borders of the three rectangles are colored; the outermost rectangle is colored red, the middle rectangle green, and the innermost rectangle is colored blue. The designation of particular colors for the rectangle is arbitrary. Any color combination may be employed or any convenient technique may be used to designate the lines forming the rectangle. The green, or middle, rectangle determines the boundaries within which all art or photographs must appear if they are to fall within the visible area on the screen. This is because the alignment procedure for the two-dimensional screen requires that only the green and blue lines be visible when properly aligned. The red line will fall beyond the edges of the screen; therefore, if art were drawn larger than the boundaries described by the green line, it would fall beyond the edges of the screen. The two-dimensional screen may also be used to project original photographs rather than just photographs of original art as with the three-dimensional screen. Where photographs are employed for the two-dimensional screen, the rectangles are used as guides in correctly cropping the photographs.

As indicated above, the colored lines permit precise alignment of the projector with the screen and the distance between them. Since the rectangles are exactly proportional in size to the outer edges of the two-dimensional screen, the projector and/or screen are moved until the colored lines are parallel to the edges of the screen. The distance between the screen and projector is then increased until the red or outer line falls beyond the edges of the two-dimensional screen leaving only the green and blue or inner two lines visible.

The alignment and registration for images projected onto the three-dimensional screen are determined by first drawing lines in vertical and horizontal axes on the first piece of art prepared for the three-dimensional screen (FIG. 9). The lines are similar to those drawn to determine the boundaries and alignment for the two-dimensional screen. The first piece of art onto which the lines are drawn is that which the artist prepared by referring to the photographs of the squares which were distorted when projected onto the three-dimensional screen. It is the first piece of art that has the distortions drawn into it.

The art for the two-dimensional screen which consists of the three colored rectangles, and the art for the three-dimensional screen are then photographed simultaneously. Throughout the photographing procedure, the art for the two-dimensional screen is held stationary in the position previously determined.

As in the case with the two-dimensional screen, two series of photographs are made. In one series the three-dimensional screen is moved for each successive photograph through the horizontal axis the distance equal to the space between two adjoining lines. In the second series the three-dimensional screen is moved in a similar fashion through the vertical axis. The images obtained from the procedure are then projected onto the dual screen or multiscreens as the case may be.

As a result of the above procedure, each frame obtained contains a dual image combining the art for the three-dimensional screen with the art for the two-dimensional screen. Each successive image is then projected onto the dual screen to determine the correct alignment and registration position for the three-dimensional screen art. This determination is made by seeing which photograph on the three-dimensional screen falls precisely on the features which make up the three-dimensional screen. On the two-dimensional screen, the projector is adjusted so that the lines of the colored rectangles of the two-dimensional screen are parallel to the edges of the rectangular screen. The distance between the projector and screen is then increased until the red rectangle falls beyond the edges of the screen leaving only the green and blue rectangles visible.

Figure 10:
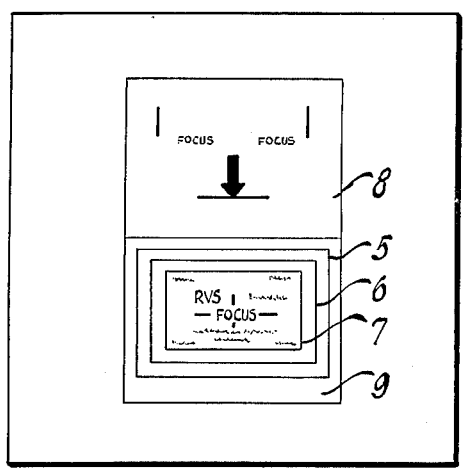
FIG. 10 is a diagrammatic view of a slide which is the first image in a series of images to be projected onto a dual screen.
Figure 11:
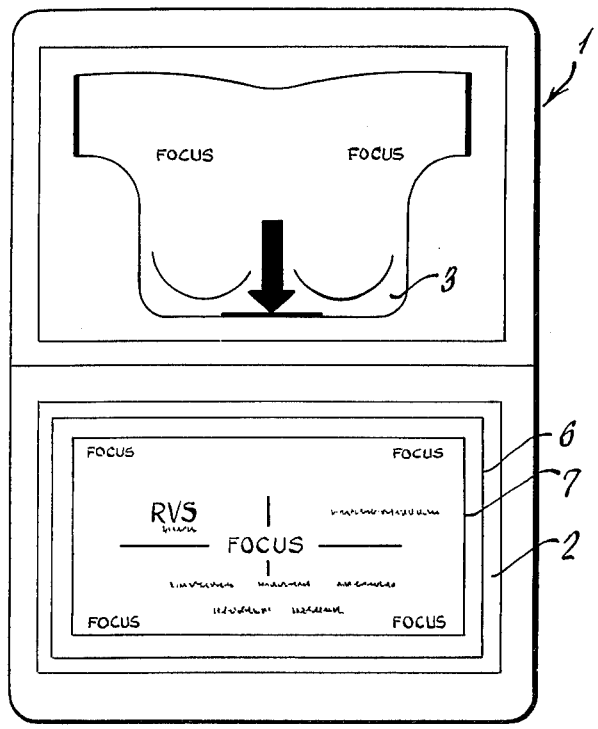
FIG. 11 is a diagrammatic view of a dual screen showing the alignment slide projected onto a three-dimensional and a two-dimensional screen.

As each image is projected, the two-dimensional screen is aligned as described. The three-dimensional screen art on each image will project to a slightly different position, analogous to the position from which it was photographed. The projected images on the three-dimensional screen will vary from left to right in one series. One of these images will demonstrate perfect or near perfect alignment with the two-dimensional screen art. If the three-dimensional screen is shaped like a human face for example, the photograph which shows the facial features in their correct position on the screen, i.e. nose, eyes, mouth in the photograph falling on that molded portion of the screen, will be the one chosen to guide preparation and positioning of all other art produced for that particular screen (FIG. 10).

Minor adjustment can be made by moving the adjustable three-dimensional screen from left to right. The letter and number of the lines indicating the position from which this particular frame was photographed is noted. These lines describe the position from which all future art pieces in the series should be photographed to maintain alignment and registration between the screen and the projector and on each screen both individually and simultaneously.

The registration/alignment frame combines the three colored rectangles in the lower part, and the guide selected for the upper part, in a single frame or image. This frame is the first image projected in a series of still or moving images. As the frame is projected, the alignment and registration are set for the two-dimensional screen using the procedure previously described. This also sets the proper elevation for the upper three-dimensional screen. Once the two-dimensional screen is registered and aligned, minor adjustments for three-dimensional screen alignment may be made by moving the adjustable three-dimensional screen to the right or left. Once this is done, all of the successively projected images in the series will maintain the registration and alignment, provided that the position of neither the projector nor the projection screens is moved during the projection of the series of images.

The three-dimensional screen or image may be a single internal organ or mechanical part, or it may represent a group of organs or parts such as the heart, lungs, a carburetor, etc. If, for example, it is desired to show the progress of arteriosclerosis, a translucent representation of a heart and its arteries can be prepared and then by projection from behind or in front of the heart, the progress of the thickening and hardening of the arterial walls can be demonstrated. By simply changing the slides either manually or mechanically, or through the use of motion pictures, any qualitative or quantitative change in the diseased area can be demonstrated.

It is also possible by means of this system to project subtitles within the images projected on the screens so as to explain the action which is taking place or to name or describe the various structural parts.

The projection system is particularly suited for demonstrating diseases of the skin. When demonstrating such conditions, it is preferred to project the image directly on the inside of the translucent structural representation of the diseased area rather than on a flat screen.

Where the term "image" is employed, what is meant is an imitation or reproduction of the form of a person or thing drawn, painted, or otherwise made perceptible to the eye. The definition is meant to include the use of a transparency or any other suitable visual representation which may be suitably mounted behind the translucent portion of the structural representation and made visible by light so as to appear within, or integral with, the structural representation.

Although it is preferred to project the image from the rear of the screen, since in most cases this would give an impression of reality, it is understood that projection in some instances could be made from the front or observer's side of the screen.

It is understood that the same procedure can be followed, with obvious adjustments, where projection only onto a single or multiple three-dimensional surface is desired.

What is claimed is:

1. A method of preparing, aligning and registering a two-dimensional image which, when projected onto multiple projection-receiving surfaces, at least one of said surfaces being a three-dimensional represenatation of said image, projects as a distortion-free image of said representation, comprising photographing and projecting a grid axis consisting of equal sized squares onto a three-dimensional screen, photographing the projection on the three-dimensional screen from several angles and positions, and projecting onto the three-dimensional screen a two-dimensional photograph prepared from a single representation of each of the photographs of the grid, said representation having incorporated therein the distortions apparent in the grid as projected onto the three-dimensional screen, making two series of photographs of a representation consisting of evenly spaced lines on horizontal and vertical axes by moving said representation horizontally in one series and with each successive photograph moving the representation to the right or left the distance equal to the space between said evenly spaced lines, repeating the same procedure through the vertical axis, projecting each photograph onto the two-dimensional screen, selecting one photograph from the horizontal and vertical series, the lines from said photographs describing a rectangle which is part of the first image in a series used to align and register the images on the screen, placing a transparent overlay containing evenly spaced lines in horizontal and vertical axes over the first piece of art prepared for the three-dimensional surface, simultaneously photographing art for the two-dimensional screen, consisting of three rectangles, and the art prepared for the three-dimensional screen, holding the art for the two-dimensional screen stationary throughout the photographing procedure, making two series of photographs of the two pieces of art, moving the art for the three-dimensional screen through one axis and then through the other, projecting both series of photographs onto two-dimensional and three-dimensional screens, aligning the two-dimensional screen art for each image such that the outer rectangle is not visible, selecting one photograph from each of the horizontal and vertical series of the three-dimensional art, said photographs being the images which most precisely register with the contour of the three-dimensional surface, noting the veritcal and horizontal lines indicating the position from which the art for the three-dimensional screen was photographed, photographing the image to be projected on the two-dimensional screen and the image to be projected on the three-dimensional screen simultaneously to form a bifurcated image, said images comprising representations drawn within the boundaries determined by the rectangle on the two-dimensional screen and the boundaries defined by the photographs selected from the horizontal and vertical series of the three-dimensional art, said bifurcated image being the first image in any series of images made for projection onto said multiple projection-receiving surfaces, repeating said photographic process with each successive piece of art, said art being photographed in the same positions used to prepare the images which were precisely aligned and registered on both the two-dimensional and the three-dimensional screens.

2. The method of claim 1 wherein the three-dimensional surface is a representation of the human body or a portion thereof.

3. The method of claim 1 wherein the projection-receiving surfaces consist of one three-dimensional surface and one two-dimensional surface.

* * * * *